July 22, 1952 — C. E. BOUCHER — 2,604,521
CONDUIT TRACTOR
Filed June 9, 1948 — 2 SHEETS—SHEET 1

INVENTOR.
Cormack E. Boucher
BY
Attorneys

July 22, 1952   C. E. BOUCHER   2,604,521
CONDUIT TRACTOR

Filed June 9, 1948   2 SHEETS—SHEET 2

INVENTOR.
Cormack E. Boucher
BY
Buckhorn and Cheetham
Attorneys

Patented July 22, 1952

2,604,521

UNITED STATES PATENT OFFICE 2,604,521

CONDUIT TRACTOR

Cormack E. Boucher, Seattle, Wash.

Application June 9, 1948, Serial No. 32,026

9 Claims. (Cl. 175—377)

The present invention relates to tractor devices particularly adapted for use in cylindrical conduits such as pipe lines. It is a general object of the present invention to provide a new and improved tractor for use in cylindrical conduits and which is characterized by its ability to move relatively heavy loads through pipe lines over relatively great distances.

A still further object of the present invention is to provide a relatively rugged, heavy duty tractor for use in cylindrical conduits such as pipe lines of relatively large internal diameter.

A still further object of the present invention is to provide a new and improved tractor for use in pipe lines and which is capable of adjustment for use in conduits of different internal diameters.

A more specific object of the invention is to provide a new and improved traction arrangement for a conduit tractor for insuring firm gripping engagement of the driving elements with the conduit wall.

For a consideration of what is believed novel and inventive, attention is directed to the following description taken in connection with the accompanying drawings while the features of novelty will be pointed out with greater particularity in the appended claims.

Figure 1:
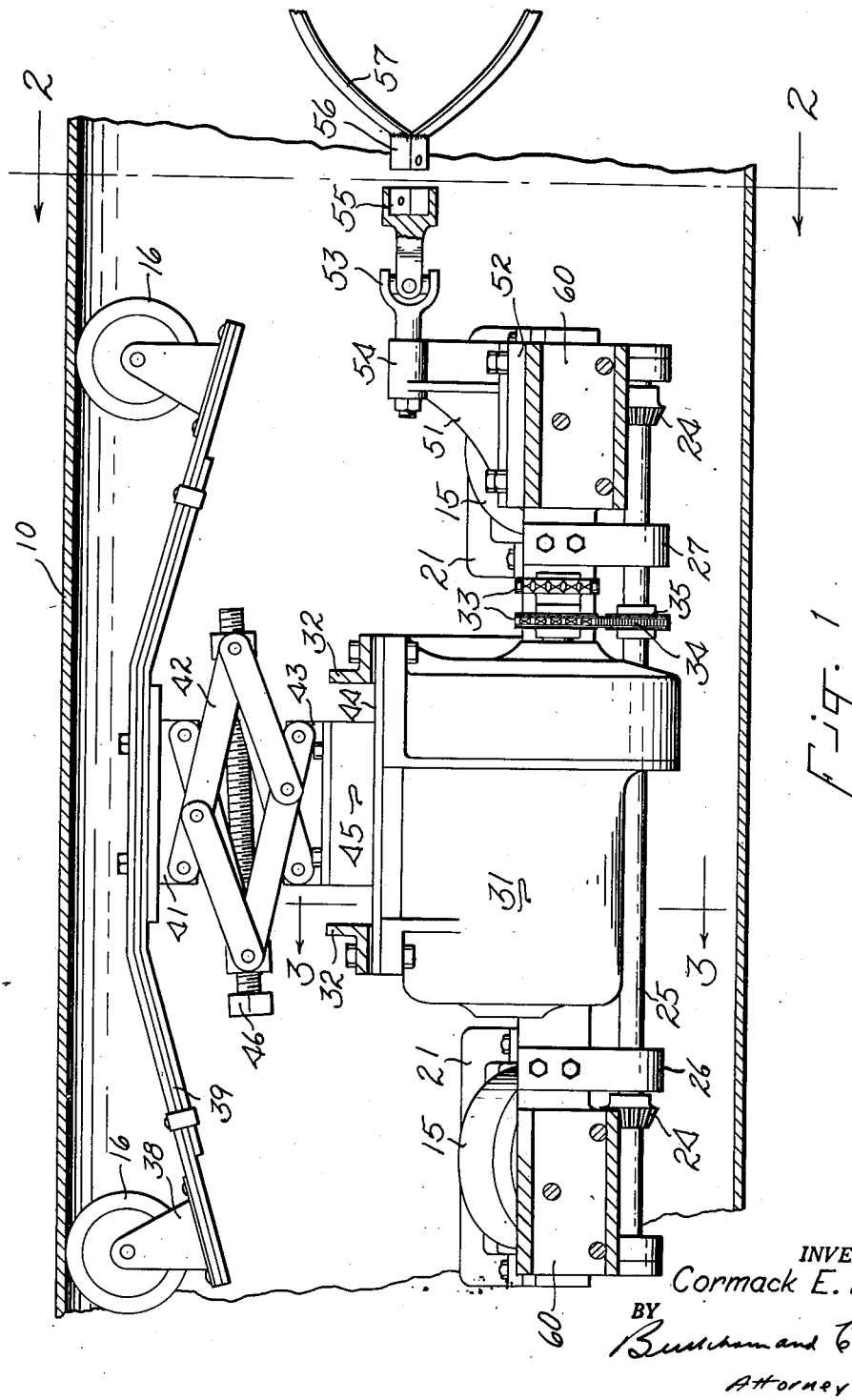
Figure 2:
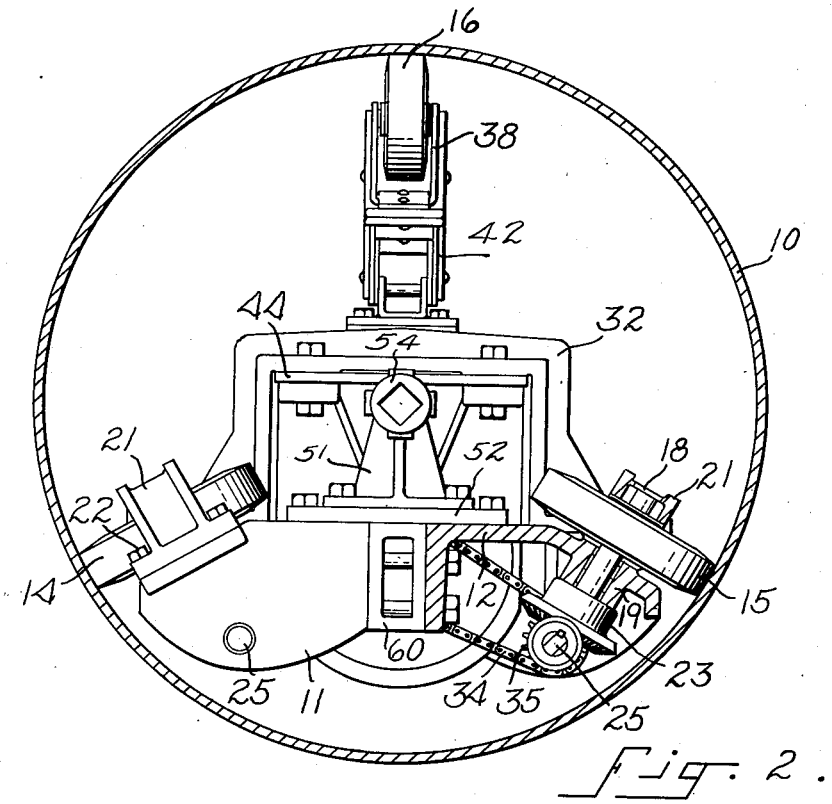
Figure 3:
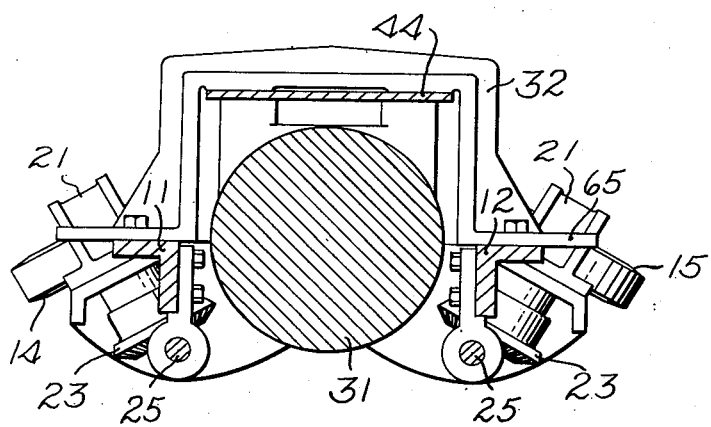

In the drawing, Fig. 1 is a side elevation, partly in section, illustrating a conduit tractor constructed in accordance with one form of the present invention; Fig. 2 is a front view of the conduit tractor taken along the line 2—2 of Fig. 1; and Fig. 3 is a cross-sectional view taken along the line 3—3 of Fig. 1.

Referring now to the drawings, a cylindrical conduit such as a pipe is shown at 10 and within which the tractor of the present invention is shown. The tractor is comprised of a base frame which, for reasons as will be pointed out more fully hereinafter, is divided longitudinally, the two similar, complementary parts being indicated by the reference characters 11 and 12. Arranged at opposite ends of the tractor are a plurality of traction elements shown in the drawings as being three in number and in this instance consisting of wheels 14, 15 and 16. It will be understood that, while a greater number of wheels may be provided at each of the opposite ends, a minimum of three is preferred. Also, while the traction elements are, in this instance, shown as consisting of wheels, they may equally well be in the form of continuous tread belts or chains arranged upon sprockets. The wheels 14, 15 and 16 at each end of the frame are spaced substantially uniformly angularly apart about a longitudinal axis corresponding substantially to the axis of the conduit 10. Moreover the corresponding wheels at the opposite ends of the tractor are rotatable in common planes parallel with and intersecting the longitudinal axis of the tractor or conduit. Thus, as will be noted from the view of Fig. 2, the wheels extend in the radial direction and their outer tread surfaces engage flatwise against the conduit wall. The wheels 14 and 15, as will be described, are driving wheels while the wheels 16 may be referred to as pressure wheels. At least the wheels 14 and 15 at the opposite ends of the tractor are covered with rubber tires or other high friction treads in order to increase the frictional engagement of the surfaces of such wheels with the conduit wall.

The wheels 14 and 15 at each of the opposite ends of the tractor are keyed onto individual shafts 18 which are journaled within cooperating bearings 19 formed integrally with the corresponding base frame portions 11 and 12. The upper ends of the shafts 18, as viewed in Fig. 2, are mounted within bearings provided in the stirrup 21 extending across each wheel, the opposite ends of the stirrups being secured to the corresponding base frame portion by means of stud bolts 22. Secured to the lower end of each of the shafts 18 is a bevel gear 23 and which, in turn, meshes with a cooperating pinion 24 mounted upon the shaft 25 extending longitudinally of each of the base frame members. The opposite ends of the shaft 25 are journaled within end wall portions of the base frame members, the shafts 25 being further supported intermediate their ends by bearing brackets 26 and 27 depending from the base frame members.

A suitable source of motive power is provided on the tractor such as an electric gear motor 31 which is suspended from a pair of arch members 32, the opposite legs of which are secured to the upper surfaces of the base frame members 11 and 12. A pair of sprockets 33 are mounted upon the gear motor shaft and are connected by corresponding chains 34 to cooperating sprockets 35 mounted upon corresponding shafts 25.

The pressure wheels 16 are mounted by brackets 38 upon the opposite ends of a longitudinal leaf spring member 39, the spring member 39 extending in the direction of the longitudinal axis of the tractor. The leaf spring member 39 is centrally supported upon a block 41 which is, in turn, mounted upon the upper end of a pantograph bracket arrangement 42, the lower end of the bracket 42 being mounted upon a block 43.

The block 43 is secured to a plate 44 extending between the arch frame members 32, a spacer block 45 being provided between the block 43 and the plate 44. The spring member 39 and, hence also, the wheels 16 may be adjusted toward and away from the axis of the tractor by means of the adjusting screw 46 extending between traveling nuts mounted in the outer ends of the pantograph bracket arms. For facilitating the insertion of the tractor into a conduit, the wheels are lowered to a retracted position and, after the tractor is positioned within the conduit, the spring member 39 is elevated to urge the wheels 16 with considerable pressure into firm engagement with the upper wall of the pipe. It will be apparent that the pantograph and adjusting screw arrangement 42, 46 constitutes a jack means which is arranged between the tractor frame and the adjustable wheels 16 for positively urging the wheels with high pressure against the conduit walls. While the pantograph and screw arrangement 42, 46 is one specific form of jack means which has been found suitable, it is obvious that other forms of suitable jack means for accomplishing the same purpose will readily occur to one skilled in the art and which may be substituted for that shown. The term "jack means" as employed in the claims is intended to include all such variations.

It will be understood by those skilled in the art that there is a normal tendency for conduit tractors to rotate about the axis of the conduit in traveling therethrough particularly in negotiating bends in the conduit and also depending upon the nature and characteristics of the load attached to the tractor. It is important, therefore, that the spring member 39 and the wheels 16 as well as the pantograph bracket arm arrangement 42 be of relatively heavy dimensions so that, in the event that the tractor should become inverted in the conduit, the entire weight of the tractor will be adequately supported, and in addition, the spring member 39 will, notwithstanding such inversion of the tractor, urge the driving wheels 14 and 15 into firm frictional engagement with the walls of the conduit. With the arrangement shown, the tractor will be positively retained in a predetermined longitudinal aligned relation with the conduit axis irrespective of the rotation of the tractor about such axis.

Because of the tendency for the tractor to shift rotationally about the conduit axis, coupling should be made to the connected apparatus along the line of the conduit axis so that such rotational movements will not interfere with the functioning of the other apparatus which may be connected thereto. As shown, a coupling bracket 51 is mounted on one end of the tractor with a spacer block 52 arranged between the base of the bracket 51 and the base frame members 11 and 12. In order to facilitate negotiation of the pipe bends, a universal joint 53 is illustrated attached to the eye 54 of the bracket 51, the longitudinal axis of the universal element 53 coinciding with the axis of the tractor or, in other words, the axis of the conduit 10. The universal element includes a socket 55 for cooperatively receiving a fitting 56 attached to another piece of apparatus by means of bracket arms 57. The present invention, however, is not concerned with the details of the apparatus to be used in conjunction with the tractor. Power may be supplied to the electric motor 31 through a conductor cable (not shown) and through which the operation of the motor may also be controlled. The cable may be anchored in any suitable manner to the tractor.

The tractor as shown may be readily adapted for use in conduits of different internal diameters by adjusting the spacing between the wheels and the longitudinal axis of the tractor. As previously described, the base frame members 11 and 12 are longitudinally divided with their opposite end portions secured together with a spacer block 60 provided therebetween. As previously mentioned, a spacer block 45 is also provided between the base of the pantograph bracket 42 and the plate 44 arranged between the arch frame members 32. The thickness of the spacer blocks 60 and 45 may be selected in accordance with the internal diameter of any given conduit in order that the wheels of the tractor will properly engage against the conduit walls in radial relation therewith. It will be obvious, however, that, as the side frame members 11 and 12 are spread apart by the varying size of the spacer blocks 60, proper adjustment will be required to be made for the connection of the lower ends of the arch frame members 32 therebetween. As illustrated in Fig. 3, the bottom ends of the arch frame members 32 may be provided with lateral extensions 65 for facilitating anchorage thereof upon the base frame members 11 and 12 for various degrees of separation thereof. Since the distance between the motor and the driven shafts 25 is varied, the length of the drive chains 34 will have to be correspondingly adjusted. Also, in order to maintain the eye of the coupling bracket 51 aligned with the conduit axis, proper adjustment should be made in the thickness of the spacer block 52 between the bracket base and the base frame of the tractor.

Having described the invention in what is considered to be a preferred embodiment thereof, it is desired that it be understood that the specific details shown are merely illustrative and that the invention may be carried out by other means.

I claim:

1. A tractor adapted for use in a cylindrical conduit, said tractor comprising a frame, at least three traveler elements mounted on said frame adapted for engaging the wall of said conduit and for supporting said tractor for movement longitudinally of said conduit, said elements being spaced substantially uniformly angularly apart about a longitudinal axis corresponding substantially to the conduit axis, screw adjustment means for one of said elements for effecting movement thereof in a direction toward and away from said axis for facilitating insertion of said tractor into a conduit with said one element retracted, resilient means mounting said one element on said frame whereby when said one element is adjusted into pressurable engagement with the conduit wall firm engagement is effected by all of said elements against said conduit wall.

2. A tractor adapted for use in a cylindrical conduit, said tractor comprising a base frame, at least three wheels arranged on opposite ends of said frame for supporting said tractor for rolling movement longitudinally within said conduit, said wheels at each end of said frame being spaced substantially uniformly angularly apart about a longitudinal axis corresponding substantially with the conduit axis, corresponding wheels at opposite ends of said frame being mounted for rotation in a common plane extending parallel with and intersecting said longitudinal axis, a longitudinal spring member extending in the direction of said longitudinal axis, one pair of corresponding wheels at opposite ends of said frame being mounted upon the opposite ends of said spring member, adjustable jack means mounted upon said frame and supporting said spring member at the center thereof, said adjustable jack means being operative for shifting said spring member toward and away from said longitudinal axis.

3. A tractor adapted for use in a cylindrical conduit, said tractor comprising a base frame, three wheels arranged at opposite ends of said frame for supporting said tractor for rolling movement longitudinally within said conduit, said wheels at each end of said frame being spaced substantially uniformly angularly apart about a longitudinal axis corresponding substantially to the conduit axis, corresponding wheels at opposite ends of said frame being rotatable in a common plane parallel with and intersecting said longitudinal axis, a longitudinal spring member adjustably mounted on said frame and supporting one pair of corresponding wheels at opposite ends thereof, the remaining two pairs of corresponding wheels being mounted on opposite sides of said base frame, said base frame including two similar longitudinal complementary frame members bolted relatively together at opposite end portions, said frame members being laterally separable and adapted for receiving spacer elements between said end portions for adapting said tractor for use in conduits of different internal diameters.

4. A tractor adapted for use in a cylindrical conduit, said tractor comprising a base frame, three wheels arranged at opposite ends of said frame for supporting said tractor for rolling movement longitudinally within said conduit, said wheels at each end of said frame being spaced substantially uniformly angularly apart about a longitudinal axis corresponding substantially to the conduit axis, corresponding wheels at opposite ends of said frame being aligned with each other and rotatable in a common plane parallel with and intersecting said longitudinal axis, adjustable bracket means mounted on said frame and supporting one pair of corresponding aligned wheels, said base frame including two complementary longitudinal members releasably secured together at opposite ends, said members being adapted for lateral separation and for receiving spacers between said opposite ends, one aligned pair of said wheels being mounted on each of said frame members.

5. A tractor adapted for use in a cylindrical conduit, said tractor comprising a base frame, at least three wheels arranged on opposite ends of said frame for supporting said tractor for rolling movement longitudinally within said conduit, said wheels at each end of said frame being spaced substantially uniformly angularly apart about a longitudinal axis corresponding substantially with the conduit axis, corresponding wheels at opposite ends of said frame being mounted for rotation in a common plane extending parallel with and intersecting said longitudinal axis, a pair of parallel drive shafts journalled on opposite sides of said frame and extending longitudinally thereof, a pair of corresponding aligned wheels at opposite ends of said tractor being operatively connected to each of said shafts, a motor mounted on said frame and driving connections between said motor and each of said shafts.

6. A tractor adapted for use in a cylindrical conduit, said tractor comprising a longitudinal frame, at least three traveler elements mounted on said frame adapted for engaging the wall of said conduit and for supporting said tractor for movement longitudinally of said conduit, said elements being spaced substantially uniformly angularly apart about a longitudinal axis corresponding substantially to the conduit axis, adjustable bracket means mounted on said frame and supporting one of said elements, said bracket means being retractable to permit lowering of said one element to facilitate insertion of said tractor into a conduit, and adjustable jack means operatively connected between said frame and said bracket means whereby said bracket means may be positively extended after insertion of said tractor into a conduit to cause pressurable engagement of said one element with the internal surface of said conduit.

7. A conduit tractor including an elongated base frame, a pair of driving traveler elements mounted in a transversely spaced relation upon said frame for engaging the inner surface of a conduit at points spaced apart transversely of the conduit a distance less than the diameter thereof, a third traveler element, adjustable means mounting said third traveler element on said frame for movement toward and away from said frame, said three elements being spaced substantially uniformly angularly about a longitudinal axis corresponding substantially to the conduit axis, said adjustable means including manually operable adjustable jack means for positively shifting said third element from a retracted position to an extended position with respect to said frame, whereby after insertion of said tractor in a conduit with said third element retracted, said third element may be positively extended into pressurable engagement with the inner surface of a conduit and to cause said pair of elements also to pressurably engage opposite conduit surface portions.

8. A conduit tractor including an elongated base frame, a pair of driving traveler elements fixedly journalled in a transversely spaced relation upon said frame for engaging the inner surface of a cylindrical conduit at points spaced apart transversely of the conduit a distance less than the diameter thereof, a third traveler element, adjustable support means mounting said third traveler element on said frame for movement toward and away from said frame, said adjustable support means being of heavy construction and capable of supporting said tractor in an inverted position within a conduit, said third element being arranged between said pair of elements and on the side of greatest circumferential spaced relationship thereof, said adjustable means including manually operable reversible jack means for positively shifting said third element toward and away from said frame independently of said pair of elements, whereby after insertion of said tractor in a conduit with said third element retracted, said third element may be positively extended into pressurable engagement with the inner surface of a conduit and for maintaining said pair of elements in pressurable contact with opposite conduit surface portions, irrespective of relative angular position of said tractor within said conduit.

9. A conduit tractor including an elongated frame, a pair of driving traveler elements mounted in a transversely spaced relation upon said frame for engaging the inner surface of a conduit at points spaced apart transversely of the conduit a distance less than the diameter thereof, a third traveler element, adjustable bracket means mounting said third traveler element on said frame for movement toward and away from said frame, said third element being arranged between said pair of elements and on the side of said frame of greatest circumferential spaced relationship of said pair of elements, said adjustable means including positive adjustment means for positively shifting the relative position of said third element with respect to said frame, said adjustment means including a manually operable threaded shaft extending longitudinally of said frame and having an end extending adjacent one end of said frame for easy manipulation through the open end of the conduit, whereby after insertion of said tractor in a conduit with said third element retracted, said third element may be positively extended into pressurable engagement with the inner surface of a conduit and to cause said pair of elements also to pressurably engage opposite conduit surface portions.

CORMACK E. BOUCHER.

REFERENCES CITED

The following references are of record in the file of this patent:

UNITED STATES PATENTS

| Number | Name | Date |
| --- | --- | --- |
| 621,018 | Benjamin | Mar. 14, 1899 |
| 774,525 | Mack | Nov. 8, 1904 |
| 1,132,691 | Sieben | Mar. 23, 1915 |
| 1,278,453 | Frank | Sept. 10, 1918 |
| 1,717,986 | Liebau | June 18, 1929 |
| 1,860,385 | Crapo | May 31, 1932 |
| 1,995,473 | Giachetti | Mar. 26, 1935 |
| 2,089,597 | Carter | Aug. 10, 1937 |
| 2,455,273 | Schott et al. | Nov. 30, 1948 |